Patented Dec. 3, 1946

2,412,154

UNITED STATES PATENT OFFICE 2,412,154

BREAD AND PROCESS OF MAKING THE SAME

Maurice M. Jackson and Edward Hauser, Chicago, Ill., assignors to The Vienna Model Bakery, Inc., Chicago, Ill., a corporation of Delaware No Drawing. Application July 22, 1942,
Serial No. 451,968

5 Claims. (Cl. 99—90)

Our invention relates to a process for making bread and the bread which is made thereby and, more particularly, relates to a process for making bread which when fully baked has dispersed throughout its entire mass a quantity of salt which increases its palatibility and, in fact, gives it an individual flavor and taste.

In addition, our invention relates to a bread composition and a method of making the same wherein the bread will maintain its freshness and keep for as much as three weeks after it has been baked.

Heretofore, in the baking of bread, it has been found that the proportion of salt which could ordinarily be incorporated in the bread was of the order of two per cent. of the weight of flour used. This amount has been found to go completely into solution in the bread mix and to permit the yeast or other fermentation agent to properly ferment the bread dough. Where greater percentages of salt have previously been added, fermentation was greatly retarded or, in other words, proper fermentation was lengthened in time to two or three times. If, on the other hand, sufficient time was given for proper fermentation, all of the salt went into solution in the bread dough and the entire texture of the bread became too salty for palatability.

The primary object of our invention is the production of a bread which will have the necessary quantity of salt dissolved therein in order to impart ordinary bread flavor thereto and to permit the proper process of fermentation to occur and which will also have discrete undissolved particles of salt dispersed throughout its mass which will impart flavor thereto.

It is well known that a quantity of salt fully dissolved in a mass of edible material will impart an almost bitter taste thereto. We have discovered that the same quantity of salt mixed into the edible material and remaining therein in undissolved form and in discrete particles will enhance the flavor thereof and increase its palatability.

While the salt must be placed in a doughy mixture, a large proportion of which is water, our invention makes it possible to prevent the dissolution of a percentage of the salt in order to obtain the dispersal of discrete salt particles throughout the mass which will enhance the flavor of the bread.

In addition, we have found that the method by which the salt is caused to be properly dispersed throughout the bread assists in the formation of a bread dough which will, when fully baked, produce a bread which is able to keep fresh for an extended period of time.

A corollary object of our invention, therefore, is the provision of a bread and a method for making the same wherein the bread will keep fresh for an extended period of time.

A further object of our invention is the process of forming bread wherein large sized salt crystals are added to the bread dough during the process of mixing the dough at a time when the crystals will not go into solution.

One of the additional elements which assists in the formation of a uniform loaf of the bread of our invention is that our loaf is of much smaller diameter than the normal bread loaf. We have found that a bread having a diameter of approximately two inches can be made in a manner which takes full advantage of all the benefits conferred by our process.

The bread produced by our method has a flavor somewhat akin to that of a dark rye or pumpernickel bread with the additional salty flavor dispersed therethrough. The texture of the bread is fine and even and the color of the interior of the loaf is a dark golden color.

The crust is firm and crisp and relatively thin. The bread itself may be cut in very fine slices without crumbling and when toasted assumes the character of Melba toast with the additional salty flavor.

It is of value as a comestible in its own right and also as a base for sandwiches or hors d'oeuvres, whether it is plain or toasted.

The method by which this fine texture, coloring, flavor and keeping qualities are achieved and the method by which the salty but not bitter flavor is imparted to the bread will be set forth in the following description of the process and of the bread itself.

The general nature of the process by which our bread is baked is that which is now commonly called the sponge dough method, wherein a primary ferment or sponge is set.

This primary ferment may be composed of 50 pounds of strong first clear flour. To this is added 30 pounds of water, 14 ounces of yeast and two ounces of yeast food. The sponge is allowed to set for 4 hours and 30 minutes and is mixed in a slow speed mixer for about 5 minutes. Care is taken to see that when the sponge is mixed, it has a temperature of the order of 76 degrees F.

After the fermentation has progressed for a period of four hours and 30 minutes as above set forth in a room at a temperature of 80 degrees F. and having a relative humidity of 90%, the set sponge is thrown back into the mixer and there is added thereto 25 pounds of clear flour and 25 pounds of rye flour.

The rye flour which is added may consist of a mixture of 2 straight ryes. We have added a good straight rye flour for this purpose or, if preferred, we may use a mixture of 50% straight light rye and 50% dark Wisconsin rye.

To this also is added 32 pounds of water, 2 pounds of salt, 4 ounces of non-diastatic malt, 10 ounces of lard, and 1 pound of extra fine molasses.

The dough is now mixed at a slow speed for about 6 minutes. While the mixing is proceeding and about one minute before the mixing is completed, we add 6 pounds and 4 ounces of what we hereafter call a gravel salt and, if desired, 6 pounds and 4 ounces of decorticated Indian dill seed are added. The gravel salt crystals which we use are sodium chloride salt crystals of a size which will pass through a number 10 mesh screen having holes .065" and will not pass through a number 14 mesh screen having holes .051". The time for this last step is so chosen that the mixing period will not be long enough to dissolve or substantially grind down the crystals to reduced size but is sufficient so that the crystalline salts and seeds will be homogeneously distributed. The large sized salt crystals are thus added at a stage where the water has been so thoroughly permeated throughout the mass that it is unable to substantially dissolve any of the salt crystals.

The foregoing is a very important step in the entire process, particularly with reference to the time at which the gravel salt is added.

Should the gravel salt be added too soon, all of it may dissolve completely in the dough. The dough then moves too slowly in the proofing process and the bread is definitely too salty and non-palatable.

If the gravel salt is added too late, there is not sufficient mixing time to disperse the salt evenly throughout the dough and we have found that on baking there is a liquefaction around the salt crystals. Furthermore, where insufficient dispersal occurs, the loaves must then be made up by hand, as the dough then smears when run through the molding machine.

Heretofore, as previously pointed out, it has been impossible in ordinary cases to use more than approximately 2 per cent. salt in the completed bread dough. This was substantially the maximum amount of salt which could be dissolved therein without substantially injuring the flavor of the dough. Where additional salt was actually dissolved in the bread dough, then the bread dough became so salty as to actually seem to be bitter.

The process of our invention makes it possible to use approximately 4 times as much salt as previously could be used for palatability, owing to the primary fact that our process is such that the salt is not permitted to enter into solution or suspension but, in the finished product, is present in its crystallized form, although the crystals are not in their original size. The mixing action through which it has gone has reduced the crystal size.

This explains the fact that the bread does not have a bitter flavor. As is well known in the manufacture of comestibles, salt in solution in the food produces an extremely salty, even bitter flavor, when it is present in the slightest excess degree. Salt, however, sprinkled on a comestible or spread throughout in crystallized form, rather than producing a bitter or extremely salt flavor, produces a tangy appetizing flavor which is especially pleasant particularly where the bread is to be used for sandwiches or hors d'oeuvres.

The entire process depends on the matter of proper timing. The gravel salt differs from ordinary table salt in that the crystals are much larger. The larger crystals take longer to dissolve than the smaller table salt crystals. The gravel salt is thus placed in the dough at such time that despite the other steps of the process which may follow, there will still be undissolved salt after the bread is baked. The flavor of the bread thus obtained is a direct function of the amount of salt used.

We have found that the finest flavor and the one which has achieved the greatest consumer acceptance in the utilization of our product is achieved by the use of 2 per cent. table fine crystal salt which is dissolved in the bread dough plus 6¼ per cent. gravel salt. These percentages are based on the flour weight.

After the dough is mixed, it is only allowed to stand 10 minutes, as a longer period of time will allow the salt to dissolve while a shorter period of time does not permit sufficient fermentation.

The pieces are then scaled in the mechanical divider, rounded, then proofed and moulded by machine.

The pieces after they have been rounded are allowed to proof for approximately 1½ hours, which is about a ½ hour longer than is usually permitted in the case of white bread.

They are then baked for at least 45 minutes at an oven temperature ranging from 410 degrees F. at the beginning of the baking process to 380 degrees F. at the end.

The combination of the relatively cool oven with the long baking time and the small diameter loaf permits the entire loaf to be baked thoroughly and all of the ingredients to be combined in a finished loaf having the texture, appearance, flavor, baking, and keeping qualities above set forth.

In the foregoing we have described our process in general terms which, however, should be clear to those skilled in the art.

To recapitulate, the process comprises the following steps:

Step I

| | | |
|---|---|---|
| Clear flour | pounds | 50 |
| Water | do | 30 |
| Yeast | ounces | 14 |
| Yeast food | do | 2 |

Step II

Mix 5 minutes at 76° F. (slow speed).

Step III

Set 4½ hours at 80° F. and 90% rel. hum.

Step IV

Add:

| | | |
|---|---|---|
| Clear flour | pounds | 25 |
| Rye flour | do | 25 |
| Water | do | 32 |
| Salt | do | 2 |
| Non-diastatic malt | ounces | 4 |
| Lard | do | 10 |
| Molasses | pound | 1 |

Step V

Mix 6 minutes (slow speed).

Step VI

Add (while mixing) one minute before the mixing is completed:

| | |
|---|---|
| Gravel salt | 6 pounds 4 ounces |
| Decorticated Indian dill seed | 6 pounds 4 ounces |

Step VII

Stand 10 minutes.

Step VIII

Mechanical dividing—rounding and dry proofing, 15 minutes.

Step IX

Final proofing, 1½ hours.

Step X

Baking, 45 minutes at 410°—410°—380°—380° F.

In the foregoing we have set forth a process for baking a bread and a bread which contains undissolved salt particles dispersed throughout the dough.

We have described but one preferred process for obtaining this dispersal of discrete salt crystals throughout the entire mass of a finished bread.

Many variations in the process and in the bread itself should now be obvious to those skilled in the art.

Thus, it will be understood that the essence of our invention resides in the addition of a special salt and the time and percentage of such added salt.

Although we have illustrated our invention in connection with rye bread, it will be understood that we may also carry out our novel process and produce a corresponding novel bread utilizing a white flour dough to produce white bread.

We have also obtained good results in the baking of our novel bread where the baking is carried on under higher than atmospheric pressure in the oven.

We have found that with sufficiently high pressure, we can secure a greater permeation of heat into the bread dough and a correspondingly higher inside temperature which fixes the flavor.

Whereas ordinary baking operations produce a maximum temperature on the inside of the bread of the order of 207½ to 209 degrees F. at sea levels, we have found that by our novel process employing higher pressures and at the same time using a smaller diameter bread, we can secure higher inside bread temperatures.

Accordingly, we prefer to be bound not by the specific disclosures herein but only by the appended claims.

We claim:

1. A baked bread comprising a baked dough composition including rye flour, water and salt and containing dispersed through said baked dough of the order of 6 per cent. of undissolved discrete salt crystals of a size which will pass through a number 10 mesh screen and will not pass through a number 14 mesh screen.

2. A rye bread comprising 2 per cent. of table fine crystal salt dissolved in the bread dough mix and of the order of 6 per cent. of undissolved discrete salt crystals, said percentages being based on the weight of the flour in the said dough, the last mentioned salt crystals being of a size which will pass through a number 10 mesh screen and will not pass through a number 14 mesh screen.

3. A bread comprising a baked dough including rye flour, water, yeast, yeast food, and salt, and containing in an undissolved state 6¼% by weight of the flour of salt crystals of a size which will pass through a number 10 mesh screen and will not pass through a number 14 mesh screen.

4. The process of manufacturing bread which comprises adding rye flour, water and 2 per cent. salt to a set primary ferment of flour, water, yeast and yeast food, mixing the dough at a slow speed, and adding to this dough while the mix is proceeding approximately 6% of salt crystals about one minute before the mixing is completed, the last mentioned salt crystals being of a size which will pass through a number 10 mesh screen and will not pass through a number 14 mesh screen.

5. The process of manufacturing bread which comprises adding rye flour, water and 2 per cent salt to a set primary ferment of flour, water, yeast and yeast food, mixing the dough at slow speed, and adding to this dough before the mixing is completed and just before baking approximately 6 per cent of salt crystals of a size which will pass through a number 10 mesh screen and will not pass through a number 14 mesh screen.

MAURICE M. JACKSON.
EDWARD HAUSER.